United States Patent
Delorme et al.

(10) Patent No.: US 10,109,200 B1
(45) Date of Patent: Oct. 23, 2018

(54) GRAPHICAL MULTI-LAYER LIGHT ALERT DISPLAY AND CONTROL METHOD THEREOF

(71) Applicant: GM GLOBAL TECHNOLOGY OPERATIONS LLC, Detroit, MI (US)

(72) Inventors: Gilles Delorme, Whitby (CA); Jarvis Chau, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/637,429

(22) Filed: Jun. 29, 2017

(51) Int. Cl.
*G08G 1/16* (2006.01)
*B60R 22/48* (2006.01)
*B60C 23/02* (2006.01)

(52) U.S. Cl.
CPC ............ *G08G 1/166* (2013.01); *G08G 1/165* (2013.01); *G08G 1/167* (2013.01); *B60C 23/02* (2013.01); *B60R 2022/4866* (2013.01)

(58) Field of Classification Search
CPC ......... G08G 1/166; G08G 1/165; G08G 1/167
USPC ........................................................ 340/436
See application file for complete search history.

(56) References Cited

U.S. PATENT DOCUMENTS

| | | | | |
|---|---|---|---|---|
| 4,790,613 A * | 12/1988 | Moss | ................. | G02B 27/0103 340/461 |
| 4,795,223 A * | 1/1989 | Moss | ................. | G02B 27/0103 340/980 |
| 8,692,739 B2 * | 4/2014 | Mathieu | ................. | B60R 1/00 340/436 |
| 2008/0238723 A1* | 10/2008 | Fein | ................. | G06Q 30/0244 340/988 |
| 2010/0253541 A1* | 10/2010 | Seder | ................. | G01S 13/723 340/905 |
| 2013/0181823 A1* | 7/2013 | Stahlin | ................. | B60K 35/00 340/436 |
| 2014/0070932 A1* | 3/2014 | Prasad | ................. | B60Q 1/00 340/438 |
| 2014/0132407 A1* | 5/2014 | Kumai | ................. | G08G 1/0962 340/439 |
| 2016/0144895 A1* | 5/2016 | Rittger | ................. | B60Q 9/006 701/301 |

* cited by examiner

*Primary Examiner* — Kerri L NcNally

(57) ABSTRACT

A multi-layer light alert display apparatus and control method thereof are provided. The apparatus includes: an illumination device configured to illuminate a graphic generating layer, a plurality of graphic generating layers, each graphic generating layer of the plurality of graphic generating layers being configured to generate a graphic, and a controller configured to control the illumination device to allow light to pass through at least one graphic generating layer of the plurality of graphic generating layers so that the light causes a graphic corresponding to the at least one graphic generating layer to be displayed on a surface.

19 Claims, 2 Drawing Sheets

GRAPHICAL MULTI-LAYER LIGHT ALERT DISPLAY AND CONTROL METHOD THEREOF

INTRODUCTION

Apparatuses and methods consistent with exemplary embodiments relate to light alert displays. More particularly, apparatuses and methods consistent with exemplary embodiments relate to alerts corresponding to detected conditions using light alert displays.

SUMMARY

One or more exemplary embodiments provide a graphical multi-layer light alert display apparatus and control method thereof. More particularly, one or more exemplary embodiments provide a graphical multi-layer light alert display apparatus and control method capable of displaying graphics corresponding to detected conditions in different colors and at different intensities.

According to an exemplary embodiment, a display apparatus is provided. The apparatus includes an illumination device configured to illuminate a graphic generating layer, a plurality of graphic generating layers, each graphic generating layer of the plurality of graphic generating layers being configured to generate a graphic, and a controller configured to control the illumination device to allow light to pass through at least one graphic generating layer of the plurality of graphic generating layers so that the light causes a graphic corresponding to the at least one graphic generating layer to be displayed on a surface.

The apparatus may further include a lens or a diffuser configured to receive light that passes through the at least one graphic generating layer and to direct the received light to the surface. The surface may be a windshield and may include an optical wedge.

The plurality of layers may include at least one from among liquid crystal layers and light guides.

The illumination device may include at least one from among a light emitting diode, a laser, a plurality of light emitting diodes comprising at least two colors, and a plurality of lasers comprising at least two colors.

The controller may be configured to control the illumination device to output a light intensity corresponding to a detected condition. The controller may be configured to control the light intensity by controlling to output a voltage corresponding to the detected condition. The controller may also be configured to control the light intensity to increase based on an imminence or severity of the detected condition.

The controller may be configured to control the illumination device to output a color corresponding to a detected condition. The controller may configured to control the illumination device to output the color corresponding to the detected condition by activating a light or a laser that outputs the color corresponding to the detected condition. The controller may also be configured to activate the light or the laser that outputs the color corresponding to the detected condition based on an imminence or severity of the detected condition.

The detected condition may correspond to a vehicle condition from among a pedestrian alert condition, a collision alert condition, a lane departure warning condition, an obstacle warning condition, and a stability control condition.

The controller may be configured to receive the detected condition from a data bus on a vehicle.

The controller may be configured to control the plurality of graphic generating layers by activating a layer corresponding to a detected condition.

The detected condition may correspond to a vehicle condition including at least one from among a pedestrian alert condition, a collision alert condition, a lane departure warning condition, an obstacle warning condition, a stability control condition, a seat belt condition, a door ajar condition, a low washer fluid condition, an automatic transaxle warning condition, a tire pressure warning condition, a security condition, a headlight high beam condition, a shifter position condition, a cruise control condition, a light status condition, a power steering condition, and a turn signal condition.

The controller may be configured to control the plurality of graphic generating layers by deactivating all graphic generating layers from among the plurality of graphic generating layers except for layers corresponding to a detected condition.

According to an exemplary embodiment, a method for controlling a multi-layer light alert display is provided. The method includes detecting a condition, determining at least one from among a graphic, a light intensity and a color corresponding to the detected condition, controlling one or more graphic generating layers of a plurality of graphic generating layers to output a graphic corresponding to the detected condition, and controlling an illumination device to output a light intensity and a color corresponding to detected condition.

According to an exemplary embodiment, a non-transitory computer readable medium comprising computer executable instructions executable by a processor to perform a method for controlling a multi-layer light alert display is also provided.

Other objects, advantages and novel features of the exemplary embodiments will become more apparent from the following detailed description of exemplary embodiments and the accompanying drawings.

DETAILED DESCRIPTION

Figure 1:
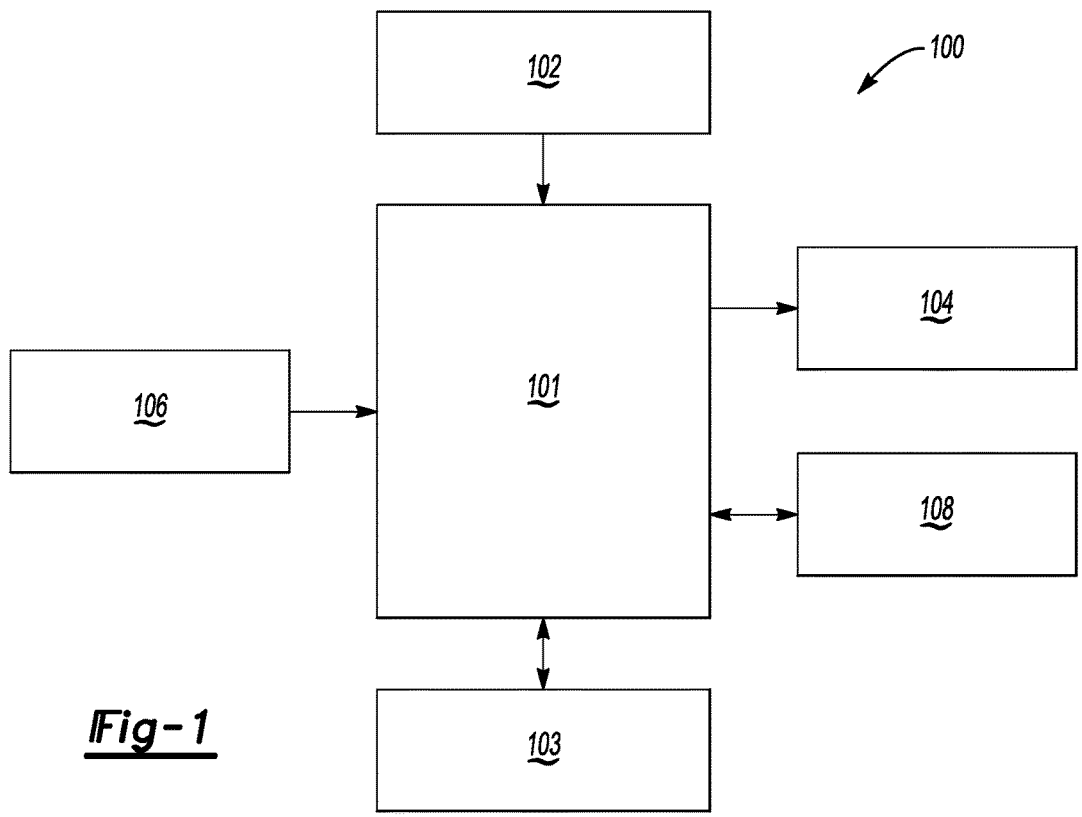
FIG. 1 shows a block diagram of a multi-layer light alert display apparatus according to an exemplary embodiment.

A multi-layer light alert display apparatus and control method thereof will now be described in detail with reference to FIGS. 1-4 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on,"

or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or combined into one or more devices. In addition, individual elements may be provided on separate devices.

Operators of devices or machines, such as vehicles, may view alerts or notifications on various displays. The alerts or notifications may be triggered by vehicle or machine conditions. Vehicle conditions may be an internal condition of a vehicle or machine or one of its components, or external conditions detected by sensors. In one example, vehicle system modules (VSMs) in the form of electronic hardware components that are located throughout the vehicle receive input from one or more sensors and use the sensed input to perform diagnostic, monitoring, control, reporting and/or other functions. The information provided by VSMs can be used to determine a vehicle condition.

The various displays in a vehicle that accommodate the alert may be difficult to view or may be cluttered with additional information that makes it difficult to discern when an alert is active or the severity, intensity or imminence of a vehicle condition associated with the alert. Thus, a display that it is easily viewable and that can provide graphical alerts of varying intensities and colors corresponding to the severity, intensity or imminence of a vehicle condition associated with the alert would be beneficial to an operator of a vehicle or machine to take the necessary action to address the alert.

FIG. 1 shows a block diagram of a multi-layer light alert display apparatus 100 according to an exemplary embodiment. As shown in FIG. 1, the multi-layer light alert display apparatus 100, according to an exemplary embodiment, includes a controller 101, a power supply 102, a storage 103, a multi-layer light alert display 104, a user input 106, and a communication device 108. However, the multi-layer light alert display apparatus 100 is not limited to the aforementioned configuration and may be configured to include additional elements and/or omit one or more of the aforementioned elements. The multi-layer light alert display apparatus 100 may be implemented as part of a vehicle or as a standalone component.

The controller 101 controls the overall operation and function of the multi-layer light alert display apparatus 100. The controller 101 may control one or more of a storage 103, a multi-layer light alert display 104, a user input 106, and a communication device 108 of the multi-layer light alert display apparatus 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the multi-layer light alert display 104, the user input 106, and the communication device 108 of the multi-layer light alert display apparatus 100. The information may be sent and received via a bus or network, or may be directly read or written to/from one or more of the storage 103, the multi-layer light alert display 104, the user input 106, and the communication device 108 of the multi-layer light alert display apparatus 100. Examples of suitable network connections include a controller area network (CAN), a media oriented system transfer (MOST), a local interconnection network (LIN), a local area network (LAN), and other appropriate connections such as Ethernet.

The power supply 102 provides power to one or more of the controller 101, the storage 103, the multi-layer light alert display 104, the user input 106, and the communication device 108 of the multi-layer light alert display apparatus 100. The power supply 102 may include one or more from among a battery, an outlet, a capacitor, a solar energy cell, a generator, a wind energy device, an alternator, etc.

The storage 103 is configured for storing information and retrieving information used by the multi-layer light alert display apparatus 100. The storage 103 may be controlled by the controller 101 to store and retrieve information about a vehicle condition, and information about information on a graphic, a color, or a light intensity corresponding to the vehicle condition. Examples of vehicle conditions include a pedestrian alert condition, a collision alert condition, a lane departure warning condition, an obstacle warning condition, a stability control condition, a seat belt condition, a door ajar condition, a low washer fluid condition, an automatic transaxle warning condition, a tire pressure warning condition, a security condition, a headlight high beam condition, a shifter position condition, a cruise control condition, a light status condition, a power steering condition, a turn signal condition. The storage 103 may also include the computer instructions configured to be executed by a processor to perform the functions of the multi-layer light alert display apparatus 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The multi-layer light alert display 104 of the user of the multi-layer light alert display apparatus 100 may display alerts or notifications in graphical, text, colored light form. The alert or notifications may include one or more colors, one or more light intensities, and one or more unique graphics. The multi-layer light alert display 104 may be controlled by the controller 101 to display alerts or notifications to an operator of a vehicle or a machine. The notifications may be displayed or reflected by a windshield or other surface of a machine or vehicle. The multi-layer light alert display 104 may display notifications or alerts on an A-Pillar (front), a door, B-Pillar (middle), or a C-Pillar (rear) of a vehicle. Moreover, the multi-layer light alert display 104 may also display notifications or alerts on one or more of a windshield, a rear window, side windows, and mirrors of a vehicle.

The multi-layer light alert display 104 may display alerts and notifications along with output from other devices including one or more from among a speaker, a display, a transparent display, a centrally-located display, a head up display, a windshield display, a haptic feedback device, a vibration device, a tactile feedback device, a tap-feedback device, a holographic display, an instrument light, an indicator light, etc.

The user input 106 is configured to provide information and commands to the multi-layer light alert display apparatus 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the alert or notification output by the multi-layer light alert display 104. The user input 106 may also be configured to receive a user input to cycle through notifications or different screens of a notification.

The communication device 108 may be used by the multi-layer light alert display apparatus 100 to communicate with various types of internal and/or external apparatuses according to various communication methods. The communication device 108 may be used to send/receive object information to/from the controller 101 of the multi-layer light alert display apparatus 100. The communication device 108 may also be configured to transmit, receive or detect vehicle conditions from one or more VSMs.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long term evolution (LTE), Bluetooth, EVDO, CDMA, GPRS, EDGE or ZigBee.

In one example, VSMs may be connected by a communications bus to the other VSMs, as well as to the controller 101, and can be programmed to run vehicle system and subsystem diagnostic tests. The controller 101 may be configured to send and receive information from the VSMs and to control VSMs to perform vehicle functions. As examples, one VSM can be an engine control module (ECM) that controls various aspects of engine operation such as fuel ignition and ignition timing, another VSM can be an external sensor module configured to receive information from external sensors such as cameras, radars, LIDARs, and lasers, another VSM can be a powertrain control module that regulates operation of one or more components of the vehicle powertrain, and another VSM can be a body control module that governs various electrical components located throughout the vehicle, like the vehicle's power door locks and headlights.

According to another example, the engine control module may be equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. The above-mentioned VSMs are only examples of some of the modules that may be used in vehicle or machine, as numerous others are also available.

The controller 101 of the multi-layer light alert display apparatus 100 may be configured to detect a condition, determine at least one from among a graphic, a light intensity and a color corresponding to the detected condition, control one or more graphic generating layers of a plurality of graphic generating layers to output a graphic corresponding to the detected condition, and control an illumination device to output a light intensity and a color corresponding to detected condition.

The controller 101 of the multi-layer light alert display apparatus 100 may be configured to receive the detected condition from a data bus on a vehicle. The controller 101 of the multi-layer light alert display apparatus 100 may be configured to control the plurality of graphic generating layers by deactivating all graphic generating layers from among the plurality of graphic generating layers except for layers corresponding to a detected condition or by activating a layer corresponding to a detected condition.

The controller 101 of the multi-layer light alert display apparatus 100 may be configured to control to activate the light or the laser of the illumination device to output a color corresponding to the detected condition and/or on an imminence or severity of the detected condition. The controller 101 may also be configured to control the illumination device to output a light intensity corresponding to a detected condition and/or an imminence or severity of the detected condition.

The imminence or severity of the detected condition may be determined based on depths, locations and trajectories of objects external to a vehicle or machine. The imminence or severity of the detected condition may also be based on one or more from among a distance between the object and the machine or vehicle, a position of the object, and a speed of the object.

Figure 2:
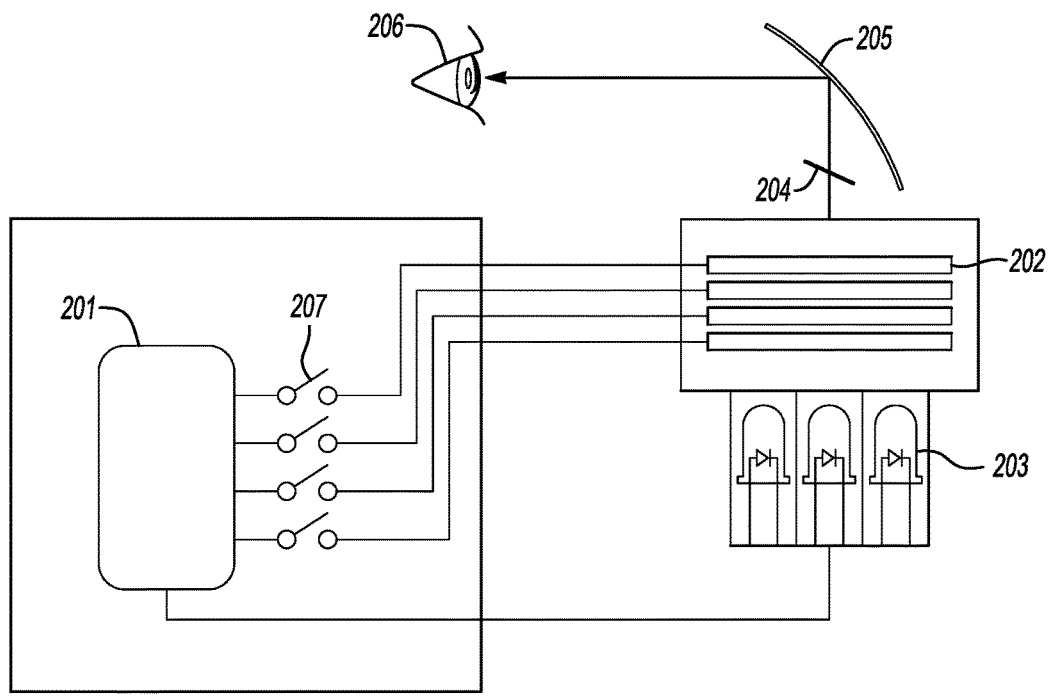
FIG. 2 shows a diagram of a multi-layer light alert display according to an exemplary embodiment.

FIG. 2 shows a diagram of a multi-layer light alert display 104 according to an exemplary embodiment. The multi-layer light alert display 104 may include an illumination device 203, a plurality of graphic generating layers 202, and a controller 201 configured to control the illumination device and the plurality of graphic generating layers.

According to an example, the controller 201 may receive information corresponding to a condition to be displayed by the multi-layer light alert display 104. The information may be received from a data bus. The controller 201 may process the information to determine light or laser color and intensity and control one or more of the plurality of graphic generating layers 202 based on the information. The controller 201 may control switches 207 to activate deactivate lights, lasers, and graphic generating layers 202. The controller 201 may also control an output voltage to control an intensity output by the illumination device 203.

According to an example, the plurality of graphic generating layers 202 may include liquid crystal layers or light guide layers. The layers may be thin and stacked vertically or horizontally. Each of the plurality of graphic generating layers may be configured to shape a light or a laser that passes through to output the light or laser in a form of a graphic or text. In one example, each layer may be etched with a defined or unique graphic. The plurality of graphic generating layers may be transparent when deactivated, thereby allowing light to pass thorough substantially unchanged. When a graphic generating layer is active, it may shape or direct the light in the form of graphic, thereby displaying the graphic on a surface that receives the light from the graphic generating layer.

According to an example, the illumination device 203 may include one or more of light emitting diode(s) (LEDs) or laser(s). The laser(s) or LED(s) may include one or more colors. Moreover, the laser(s) or LED(s) are configured to pass a light or a laser through one or more of the plurality of graphic generating layers.

According to another example, the multi-layer light alert display 104 may include a lens or diffuser 204 configured to receive a light that passes through the plurality of graphic generating layers 202 and pass the light to a windshield 205 or other surface that is viewable by a user 206. The windshield 205 or other viewable surface may include an optical wedge configured to reduce glare. The windshield 205 or other surface may display or reflect a graphic corresponding to one or more of the plurality of graphic generating layers.

Figure 3:
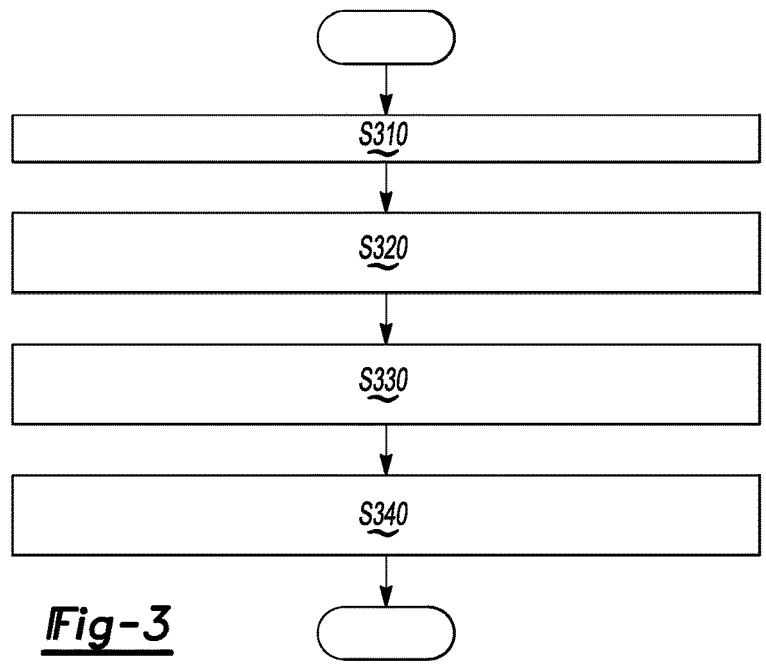
FIG. 3 shows a flowchart for a method for controlling a multi-layer light alert display apparatus according to an exemplary embodiment.

FIG. 3 shows a flowchart for a method for controlling a multi-layer light alert display apparatus according to an exemplary embodiment. The method of FIG. 3 may be performed by the multi-layer light alert display apparatus 100 or may be encoded into a computer readable medium as instructions that are executable by a computer or processor to perform the method.

Referring to FIG. 3, a condition is detected in operation S310. The condition may be a vehicle alert condition generated by a VCM. After the condition is detected, one or more from among a graphic, a light intensity and a color corresponding to the detected condition is determined in operation S320.

In operation S330, one or more graphic generating layers of a plurality of graphic generating layers are controlled to output a graphic corresponding to the detected condition. An illumination device is also controlled to output a light intensity and a color corresponding to detected condition in operation S340.

Figure 4:
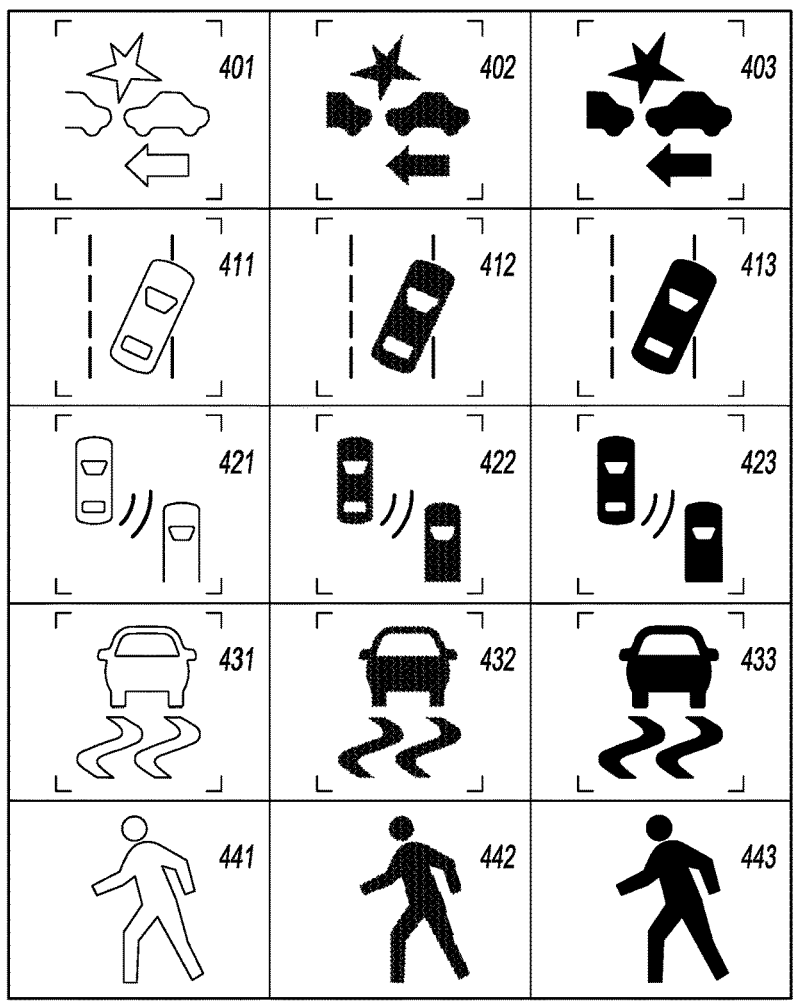
FIG. 4 shows an illustration of graphical alerts displayed by the multi-layer light alert display apparatus according to an aspect of an exemplary embodiment.

FIG. 4 shows an illustration of graphical alerts displayed by the multi-layer light alert display apparatus according to an aspect of an exemplary embodiment.

Referring to FIG. 4, the multi-layer light alert display 104 may output a graphical notification or alert. The notification may include information regarding one or more vehicle conditions. In addition, the multi-layer light alert display 104 may output displaying a graphical indicator corresponding to the detected object or obstacle. In one example, the graphical indicator may be a silhouette of the object or pedestrian.

Examples of alerts include a forward collision warning alert system icon shown displayed in one of three different colors 401-403 depending on imminence of the potential collision, a lane departure warning system alert in displayed one of three different colors 411-413 depending on imminence of the lane departure or deviation from the center of a lane, an obstacle warning alert displayed one of three different colors 421-423 depending on a distance between the obstacle and machine or vehicle., a stability control system alert displayed one of three different colors 431-433 depending an amount of traction detected at the wheels, or a pedestrian alert displayed one of three different colors 441-443 depending on a location, speed and/or trajectory of a pedestrian.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A display apparatus, the apparatus comprising:
    an illumination device configured to illuminate a graphic generating layer;
    a plurality of graphic generating layers, each graphic generating layer of the plurality of graphic generating layers being configured to generate a graphic; and
    a controller configured to control the illumination device to allow light to pass through at least one graphic generating layer of the plurality of graphic generating layers so that the light causes a graphic corresponding to the at least one graphic generating layer to be displayed on a surface,
    wherein the surface comprises an optical wedge.

2. The apparatus of claim 1, further comprising:
    a lens or a diffuser configured to receive light that passes through the at least one graphic generating layer and to direct the received light to the surface.

3. The apparatus of claim 2, wherein the surface comprises a windshield.

4. The apparatus of claim 3, wherein the plurality of graphic generating layers comprise at least one from among liquid crystal layers and light guides.

5. The apparatus of claim 4, wherein the illumination device comprises at least one from among a light emitting diode, a laser, a plurality of light emitting diodes comprising at least two colors, and a plurality of lasers comprising at least two colors.

6. The apparatus of claim 1, wherein the controller is configured to control the illumination device to output a light intensity corresponding to a detected condition.

7. The apparatus of claim 6, wherein the controller is configured to control the light intensity by controlling to output a voltage corresponding to the detected condition.

8. The apparatus of claim 7, wherein the controller is configured to control the light intensity to increase based on an imminence or severity of the detected condition.

9. The apparatus of claim 8, wherein the detected condition corresponds to a vehicle condition from among a pedestrian alert condition, a collision alert condition, a lane departure warning condition, an obstacle warning condition, and a stability control condition.

10. The apparatus of claim 1, wherein the controller is configured to control the illumination device to output a color corresponding to a detected condition.

11. The apparatus of claim 10, wherein the controller is configured to control the illumination device to output the color corresponding to the detected condition by activating a light or a laser that outputs the color corresponding to the detected condition.

12. The apparatus of claim 11, wherein the controller is configured to activate the light or the laser that outputs the color corresponding to the detected condition based on an imminence or severity of the detected condition.

13. The apparatus of claim 11, wherein the detected condition corresponds to a vehicle condition from among a pedestrian alert condition, a collision alert condition, a lane departure warning condition, an obstacle warning condition, and a stability control condition.

14. The apparatus of claim 13, wherein the controller is configured to receive the detected condition from a data bus on a vehicle.

15. The apparatus of claim 1, wherein the controller is configured to control the plurality of graphic generating layers by activating a layer corresponding to a detected condition.

16. The apparatus of claim 15, wherein the detected condition corresponds to a vehicle condition, and
wherein the vehicle condition is one from among a pedestrian alert condition, a collision alert condition, a lane departure warning condition, an obstacle warning condition, a stability control condition, a seat belt condition, a door ajar condition, a low washer fluid condition, an automatic transaxle warning condition, a tire pressure warning condition, a security condition, a headlight high beam condition, a shifter position condition, a cruise control condition, a light status condition, a power steering condition, and a turn signal condition.

17. The apparatus of claim 1, wherein the controller is configured to control the plurality of graphic generating layers by deactivating all graphic generating layers from among the plurality of graphic generating layers except for layers corresponding to a detected condition.

18. A method for controlling a multi-layer light alert display, the method comprising
detecting a condition;
determining at least one from among a graphic, a light intensity and a color corresponding to the detected condition;
controlling one or more graphic generating layers of a plurality of graphic generating layers to output a graphic corresponding to the detected condition; and
controlling an illumination device to illuminate a surface by outputting a light intensity and a color corresponding to detected condition,
wherein the surface comprises an optical wedge.

19. A non-transitory computer readable medium comprising computer executable instructions executable by a processor to perform a method for controlling a multi-layer light alert display, the method comprising:
detecting a condition;
determining at least one from among a graphic, a light intensity and a color corresponding to the detected condition;
controlling one or more graphic generating layers of a plurality of graphic generating layers to output a graphic corresponding to the detected condition; and
controlling an illumination device to illuminate a surface by outputting a light intensity and a color corresponding to detected condition,
wherein the surface comprises an optical wedge.

* * * * *